United States Patent

[11] 3,590,641

| [72] | Inventor | Gerard D. Eggleston |
| --- | --- | --- |
| | | Danvers, Mass. |
| [21] | Appl. No. | 735,128 |
| [22] | Filed | June 6, 1968 |
| [45] | Patented | July 6, 1971 |
| [73] | Assignee | Microdot Inc. |
| | | Westwood, Mass. |

[54] PRESSURE GAGE
7 Claims, 10 Drawing Figs.

[52] U.S. Cl. ............................................... 73/418,
73/395
[51] Int. Cl. ............................................... G01l 7/04
[50] Field of Search ........................................... 73/398 R,
418, 406, 395, 411, 420, 410

[56] References Cited
UNITED STATES PATENTS

| 1,685,457 | 9/1928 | Lamb | 73/418 |
| 3,163,046 | 12/1964 | Haston | 73/418 |
| 3,273,400 | 9/1966 | Pastan | 73/398 |

FOREIGN PATENTS

| 264,873 | 6/1927 | Great Britain | 73/393 |
| 792,152 | 10/1935 | France | 73/393 |

*Primary Examiner* — Donald O. Woodiel
*Attorney* — Wolf, Greenfield and Hieken

ABSTRACT: A direct reading pressure gage having a coupler chamber at one end and a Bourdon tube on the other connected by a capillary tube. The coupler chamber, capillary and Bourdon tubes are filled with a liquid having a total volume in the order of 0.004 cubic inch to minimize volumetric displacement.

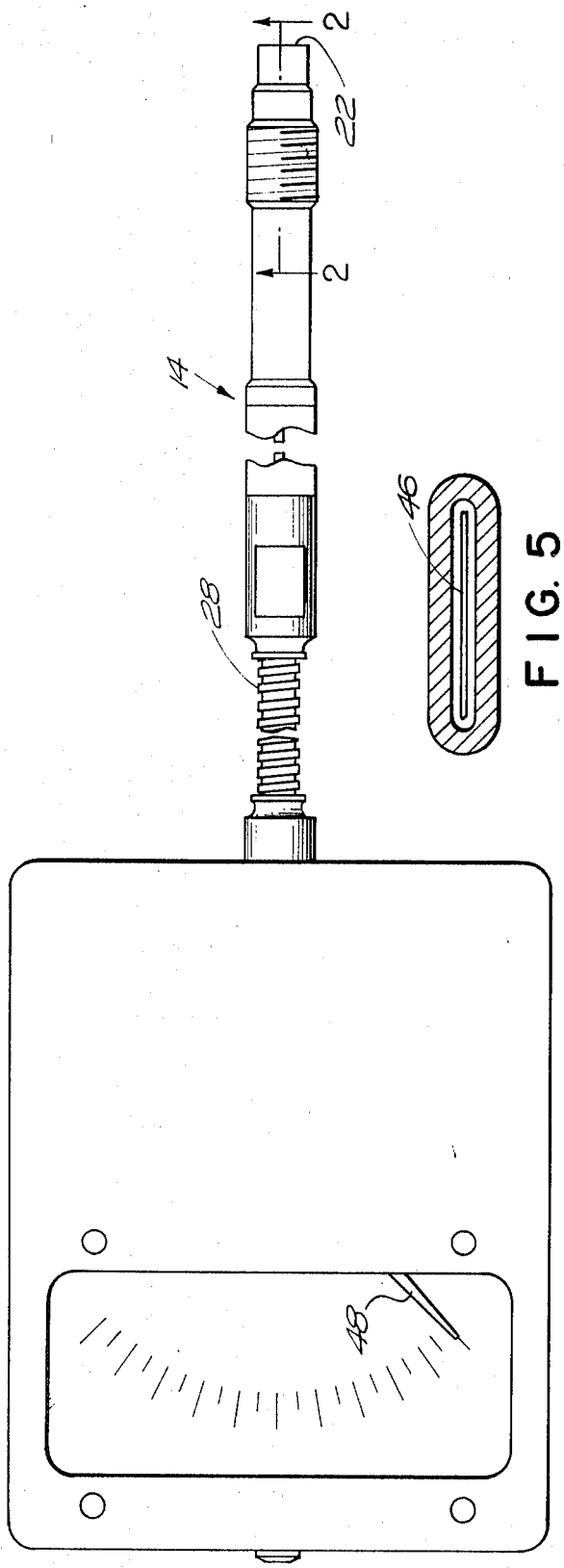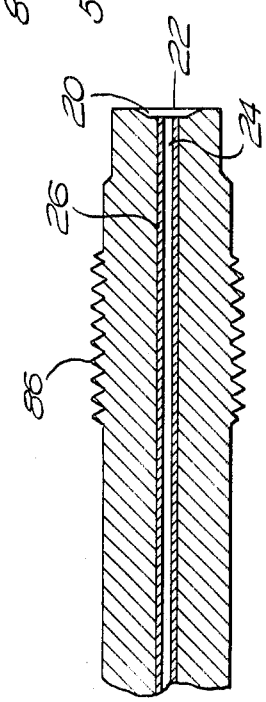

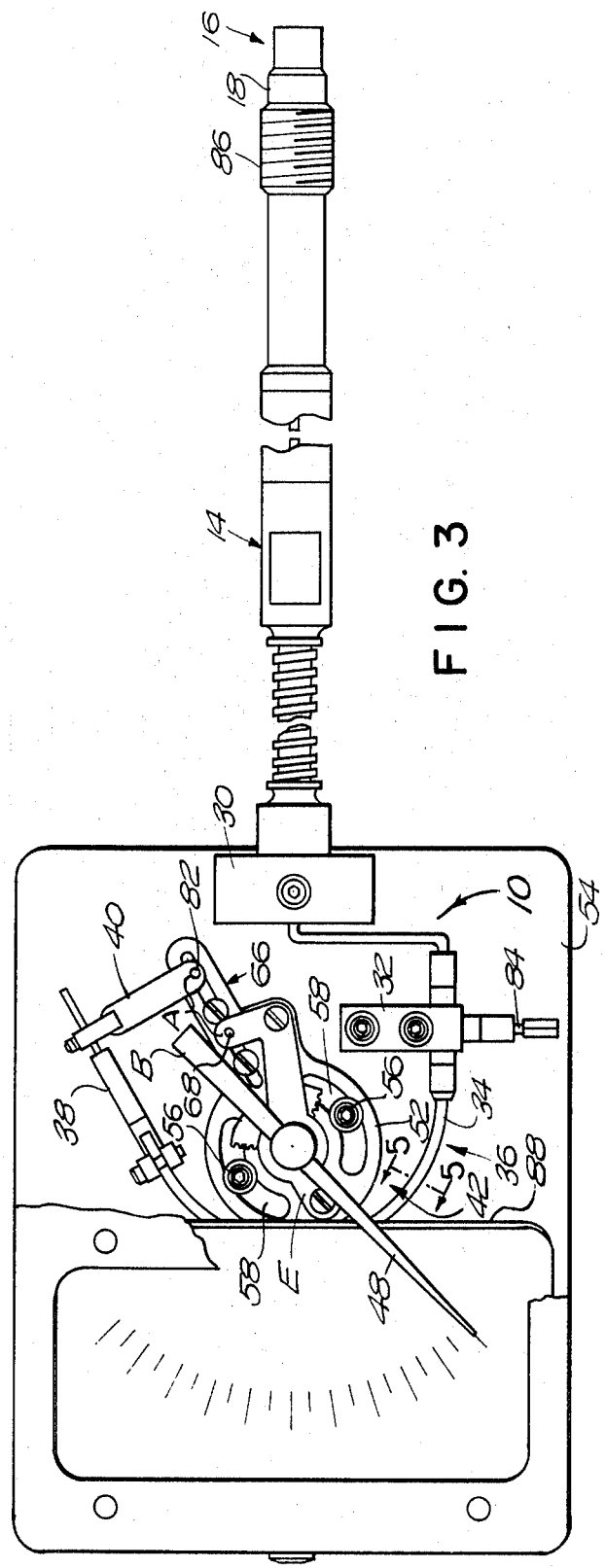

INVENTOR
GERARD D. EGGLESTON
BY
Wolf, Greenfield + Hieken
ATTORNEYS

PRESSURE GAGE

This application is a continuation-in-part of my earlier application Ser. No. 691,036 filed Dec. 15, 1967, entitled Pressure Gage, now abandoned.

This invention relates to pressure gages and more particularly comprises a new and improved direct reading pressure gage.

The pressure gage of this invention is particularly designed for use in process control. Typically, the device may be used for measuring the melt pressure of thermoplastic materials during extrusion. Two common types of instruments used for this purpose are the grease filled Bourdon tube gage and the flush diaphragm strain gage transducer. This latter type of instrument is disclosed in U.S. Pat. No. 3,349,623 dated Oct. 31, 1967.

The most serious limitation of the commonly used Bourdon gage is that the gage fitting must be filled with grease. The grease may contaminate the material whose pressure is being measured, and/or it may lead to the discoloration of that material, which obviously produces quality problems when the material is plastic being extruded in special shapes for its end use. The flush diaphragm strain gage transducer does not have the problems of the so-called Bourdon gage, but rather is an excellent device in process control, such as for measuring the melt pressure, particularly where an electrical signal is required for remote indication or control. However, in many installations only a local indication of pressure is required, and there is a need for an economical means of displaying this information utilizing a flush diaphragm design.

The advantages of the flush diaphragm design are described in detail in U.S. Pat. No. 3,349,623, supra. Summarizing those advantages briefly, the flush diaphragm design provides a fluid filled pressure transducer that produces full scale deflection of the sensing device with a minimum volumetric displacement and minimizes the effect upon the fluid medium whose pressure is being measured. The minimum volumetric displacement also minimizes coupler deflection, and if the coupler is a diaphragm, the diaphragm deflection is maintained within the linear range.

One important object of this invention is to provide a direct reading pressure transducer with a minimum volumetric displacement. The total volume of the liquid fill in the gage is in the order of 0.004 cubic inch.

A more specific object of this invention is to provide means in the pressure transducer having minimum volumetric displacement for converting changes in pressure to scale deflection.

Yet another important object of this invention is to provide a relatively inexpensive gage for providing local indication of melt pressure in an extruder.

Still another important object of this invention is to provide a direct reading pressure gage which is capable of operating without special cooling with the pressure coupler operating at temperatures up to approximately 750° F.

And another important object of this invention is to provide means for coupling the gage to the chamber wall without twisting or otherwise disturbing the sensor assembly of the gage.

Another important object of this invention is to provide a direct reading pressure gage with a "readout" that responds directly to pressure changes without intermediate linkages or other devices.

And still another important object of this invention is to provide a gage which may be assembled easily and quickly so as to minimize the labor costs in the manufacture of the device.

To accomplish these and other objects, the pressure transducer of this invention includes an elongated frame with a coupler chamber closed by a diaphragm at one end. A capillary tube extends from the chamber through the frame to a sensor assembly which includes a Bourdon tube. The free end of the Bourdon tube is in turn connected to a needle actuator of a direct readout gage. In one embodiment of this invention, a threaded sleeve is mounted at the diaphragm end of the elongated frame, which sleeve is rotatable on the frame and allows the frame to be screwed into an internally threaded opening in the wall of a chamber without disturbing the frame or the sensor assembly to which the frame is connected.

These and other objects and features of this invention along with its incident advantages will be better understood and appreciated from the following detailed description of several embodiments thereof, selected for purposes of illustration and shown in the accompanying drawing, in which:

FIG. 1 is a plan view of a direct reading pressure gage constructed in accordance with this invention;

FIG. 2 is a fragmentary cross-sectional view taken along the section line 2-2 of FIG. 1;

FIG. 3 is an enlarged detail view of one embodiment of a sensing assembly constructed in accordance with this invention;

FIG. 4 is a side view of the sensing assembly of FIG. 3;

FIG. 5 is a cross-sectional view of the Bourdon tube taken along the section line 5-5 of FIG. 3;

FIG. 7 is a cop view of the actuator forming part of the movement;

Figure 6:
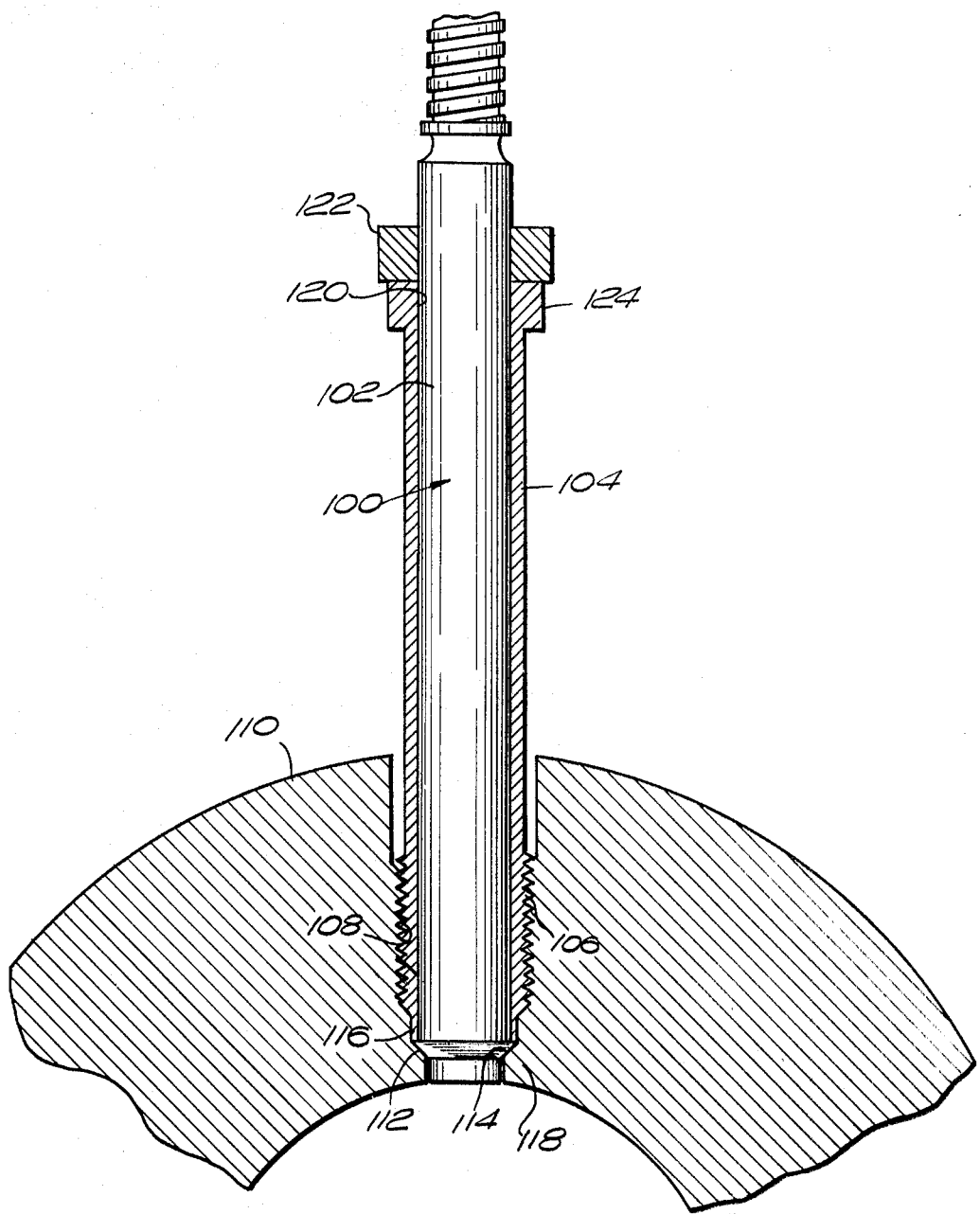
FIG. 6 is an enlarged fragmentary cross sectional view similar to FIG. 2 but showing a preferred form of frame.

The gage shown in FIG. 1 includes in its general organization a sensor assembly 10 contained in a housing 12, and an elongated frame 14 having a coupler 16 at the free end of the frame.

As is suggested in the introduction and described in U.S. Pat. No 3,349,623, supra, it is extremely desirable that minimum volumetric displacement occur over the full operative range of the transducer. In order to achieve this goal, the total fill of liquid in the device is kept in the order of approximately 0.004 cubic inch. The liquid which necessarily must have a boiling point higher than the temperature to which the coupler 16 is to be exposed so as to prevent the production of extraneous pressure within this system, fills the coupler 16 that is defined at the probe end 18 of the frame 14.

The coupler 16 is formed in part by a shallow cavity 20 at the exposed end of the frame, and the cavity is closed by a thin, flexible, flat diaphragm 22 having a low spring rate. It is subjected to minimum stresses because it is completely supported on the inside by the fluid 24 which fills the cavity 20 and which is at the same pressure as the medium exerted against the outside of the diaphragm, unlike diaphragms which are connected to and work against push rods, strain tubes, or other similar devices in unfilled instruments, and operate under large stresses and are subjected to diaphragm rupture.

A capillary passage 26 extends through the frame 14 including its flexible section 28. The flexible section 28 is provided to make it possible to expose the coupler 16 to fluid mediums in relatively inaccessible points in a system. In the embodiment shown, the flexible section is made of a wire type helical cable, but it is to be understood that other forms of flexible jackets may be used for this purpose. The capillary which extends through the frame is itself thin and flexible so as to conform to the bending of the frame at the flexible section. The outer diameter of the capillary tube that defined the passage may be approximately .0625 inch, and the inner diameter may be approximately .010 inch.

The frame 14 is secured to the housing 12 of the sensor assembly 10 by means of anchor 30. The capillary tube 26 which extends through the frame 14 also extends through the anchor 30 to a second anchor 32 which supports the fixed end 34 of the Bourdon tube 36. As is evident in FIG. 3, the Bourdon tube 36 turns through approximately 15020 , and its free end 38 is connected by a link 40 to the movement 42 which in turn transfers the displacement of the end of the Bourdon tube 38 to the dial indicator 44.

It will be noted in FIG. 5 that the Bourdon tube which in cross section is in the shape of a flat oval is partially filled with a soft stainless steel plate 46 so that the volumetric capacity of the tube is very limited. The plate extends through the full length of the tube. The reduced volume of liquid in the Bourdon tube reduces the heat sensitivity of the gage so as to eliminate extraneous forces from being exerted on the dial indicator caused by heat prompted deflections of the Bourdon tube. The pointer 48 of the dial indicator 44 is supported on a shaft 50 which forms part of the movement 42.

The movement 42 includes a plate 52 secured to the base 54 of housing 12 by a pair of cap screws 56 that extend through arcuate slots 58 in the plate 52. The cap screws 56 and the cooperating slots 58 allow alignment adjustments to be made on the dial indicator when the instrument is assembled.

A pair of spacers 60 support a bracket 62 above the plate 52 secured in place by screws 64, and the shaft 50 of the pointer 48 extends through openings in bracket 62 and plate 52. The openings define bearings for the shaft so as to keep it oriented in the position shown. That is, the shaft is free to rotate in the bearings, but it cannot shift radially except by movement of the plate 52 on the base 54 when the cap screws 56 are loosened.

The movement also includes an actuator 66 pivotally supported on post 68 between the plate 52 and the bracket 62. The post 68 extends between the plate 52 and bracket 62 and defines a fulcrum for the actuator. It will be noted in FIG. 3 that the right end of actuator 66 is connected to the link 40 so that when the Bourdon tube 36 deflects under pressure to straighten slightly, the actuator 66 pivots counterclockwise about the fulcrum 68.

The actuator 66 as shown in FIG. 7 is composed basically of two parts, namely, a slotted bar 70, and an arcuate rack 72 having a stem 74 which is screwed to the bar 70 by the two adjusting screws 76. The teeth 78 of rack 72 engage the pinion 80 carried by pointer shaft 50 so that pivotal movement of the actuator causes the shaft 50 to rotate and turn the pointer 48 over the face of the dial indicator. Thus it is seen that through the actuator 66, displacement of the end 38 of the Bourdon tube is converted to rotation of the pointer 48 on its shaft 50.

The adjusting screws 76 enable the distance between the fulcrum 68 and the pin 82 which connects the actuator to the link 40 to be varied so as to vary the sensitivity of the instrument. By moving the bar 70 generally to the left as viewed in FIG. 3 so as to shorten the distance between the fulcrum 68 and the pin 82, increased needle deflection will result from a given displacement of the end 38 of the Bourdon tube.

In FIG. 3 a filling tube 84 is shown through which the system may be evacuated and filled with mercury or some other noncompressible fluid.

In use, the probe end 18 the frame 14 is screwed into an opening provided in the chamber wall by means of a threaded section 86 provided adjacent the sensor 16. When threaded in the wall, the thin flexible diaphragm 22 is exposed directly to the pressure of the material in the chamber. Thus, when the instrument is used for measuring the melt pressure of thermosplastic materials during extrusion, the diaphragm 22 is exposed directly to the plastic. The very small volumetric displacement of the liquid resulting from the pressure exerted on the diaphragm is carried through the capillary tube 26 and applies a pressure in the Bourdon tube 36 so as to cause it to deflect. Its end 38 deflects in a generally counterclockwise direction under increases in pressure applied to the tube, and the deflection of the Bowrdon tube is converted through the movement 42 to pointer deflection in the dial indicator. Thus, a direct reading may be made of the pressure from the face 88. The adjustments provided for the actuator 66 enable the instrument to be adjusted so as to give full scale deflection of the indicator in the range of pressures being sensed by the diaphragm.

To mount the gage shown in FIG. 1, it is necessary to screw the threaded section 86 of the frame into the threaded opening in the chamber wall, and it is necessary to rotate the entire instrument about the longitudinal axis of the frame. This may be somewhat awkward and difficult, particularly if the frame 14 is quite long. It may also be troublesome if the housing 12 is mounted on the machine whose internal pressures are being measured by the instrument. To make it more convenient to mount the instrument in the chamber wall, the improvement shown in FIG. 6 is provided. In this embodiment, the frame 100 has a smooth exterior surface 102 and carries a rotatable sleeve 104 on which is formed the threaded section 106 that is the equivalent of the threaded section 86 in the embodiment of FIG. 1. Sleeve 104 allows the threaded portion 106 to be screwed into an opening without the necessity of rotating the entire frame and the associated housing.

As shown in FIG. 6, the instrument is screwed into the threaded hole 108 provided in the wall 110 of an extruder, and the beveled or frustoconical surface 112 of the frame is used to form the seal against the beveled seat 114 in the hole 108. As the threaded section 106 is tightened in the hole 108, it is apparent that the end 116 of the sleeve presses against the flange 118 forming the head of the frame so as to form a seal against the seat 114. When the instrument is to be removed, the sleeve 104 is rotated in an opposite direction to unscrew the section 106 from the threaded section of the hole 108. The end 120 of the sleeve bears against the flange 122 secured to the frame 100 to fore the instrument out of the opening 108. It will be noted that wrench flats 124 are provided at the rear end of the sleeve 104 so as to facilitate rotation of the sleeve to tighten and loosen the sleeve and the instrument from the hole 108. It will be appreciated that this feature may be incorporated into either of the instruments shown in FIGS. 3—5 and 8—10.

Figure 8:
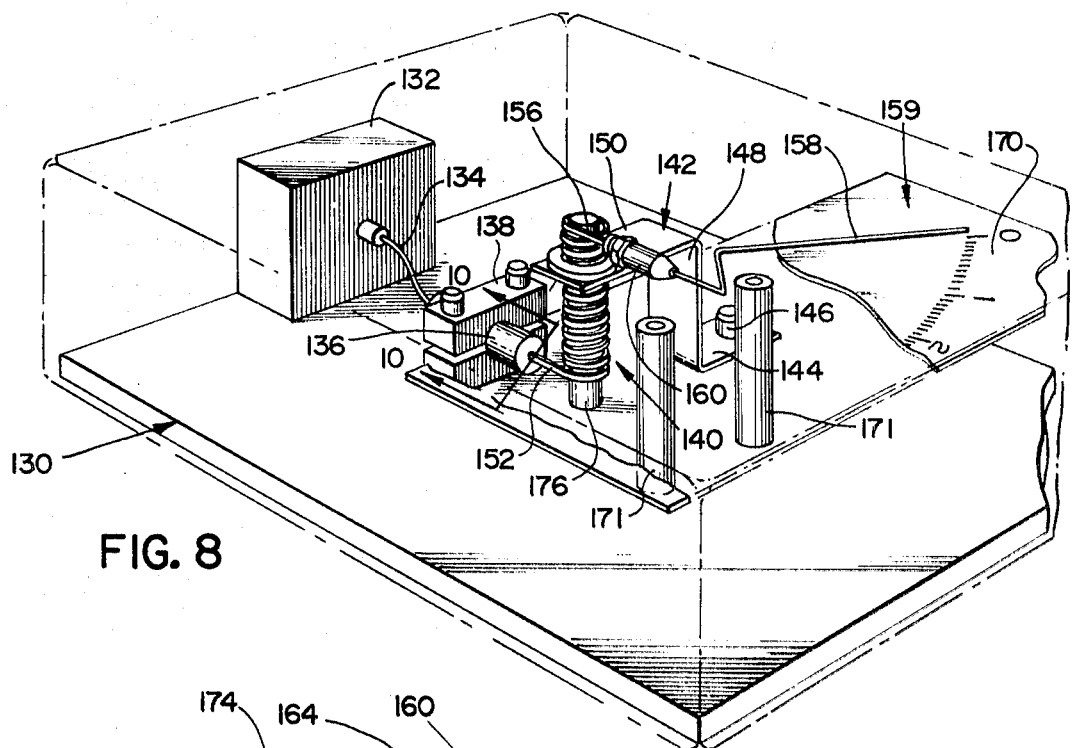
FIG. 8 is a fragmentary perspective view of the preferred form of sensing assembly in a gage constructed in accordance with this invention.
Figure 9:
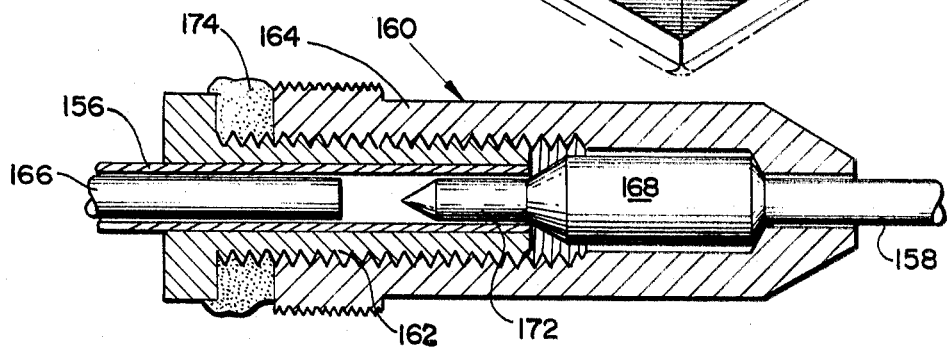
FIG. 9 is an enlarged fragmentary cross-sectional view of a portion of the sensing assembly shown in FIG. 8.
Figure 10:
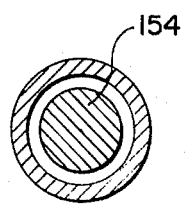
FIG. 10 is a cross-sectional view taken along the section line 10-10 of FIG. 8.

The preferred embodiment of this invention shown in FIGS. 8—10 differs from the embodiment of FIGS. 3 and 4 only in the configuration of the sensing assembly. The elongated frame, and the coupler in the preferred embodiment are identical to those shown in FIGS. 1 and 2. Consequently the frame and coupler have been omitted from the illustrations of FIGS. 8—10. The frame 14 in the preferred embodiment is connected to the housing 130 by an anchor 132 identical to the anchor 30 previously described. The capillary tube which extends through the frame emerges from the anchor 132 as shown at 134, and it in turn terminates in a mechanical coupling 136. The coupling 136 is retained on the housing 130 by a clamp 138, and a helically shaped flat Bourdon tube 140 has its lower end connected to the other end of the coupling 136. Thus, the coupling 136 serves to join the end of the capillary 134 to the Bourdon tube 140.

The Bourdon tube 140 is generally supported by a Z-shaped bracket 142 having a lower leg 144 secured to the frame 130 by machine screws 146, and upstanding arm 148 perpendicular to the base of housing 130, and a second leg 150 which is generally parallel to the first leg 144. The Bourdon tube 140 is composed of a series of turns of flat stainless steel tubing with the lower turn connected to an extension 152 of circular cross section which is held by clamp 138.

As shown in FIG. 10, the lower end 152 of the Bourdon tube which extends tangentially from the lowermost convolution of the tube to the coupling 136 contains a volume filler rod 154 which is the functional equivalent of the ribbon 46 shown in FIG. 5. The rod 154 serves to reduce the liquid volume of the system so as to reduce the heat sensitivity of the instrument as has been described fully above.

The upper convolution of the Bourdon tube has a tangential extension 156 which is secured directly to the pointer 158 of the indicator 159 by means of the coupling 160. The coupling 160 is shown in detail in FIG. 9. In that figure the circular extension 156 of the tube 140 is braized to the inner surface of the hollow screw 162 which is in turn threaded into the body 164 of the coupling. The circular section 156 of the Bourdon tube 140 contains a volume filler rod 166 that performs the very same function as the rod 154 at the lower extension of the tube.

A plug 168 brazed to the inner end of the pointer 158 is disposed within the sleeve 164 of the coupling and has an extension 172 that enters the end of Bourdon tube and screw 162. When the screw 162 is tightened in the sleeve 164, the plug 168 is jammed against the end of the Bourdon tube so as to form a seal at that end and prevent any of the liquid in the system from escaping. It will also be appreciated that the instrument is filled with mercury or other similar noncompressible liquid by removing the screw 162 from the sleeve 164 so as to expose the end of the tube within it. After the system is filled, an epoxy 174 may be deposited about the end of the screw shank so as to prevent the screw from twisting in the sleeve. As is evident in FIG. 8, the pointer 158 may be bent into any desired shape so as to register with the scale 170 of the indicator, which is carried on the base of the housing by posts 171.

The Bourdon tube 140 is shown to extend from the base of the housing 130 upwardly through the upper leg 150, and the Bourdon tube may be stabilized by a cylindrical post 176 which rests on the base of the housing and extends upwardly through the convolutions of the tube. This is shown in FIG. 8. The post 176 frictionally engages each of the convolutions of the tube and therefore serves to damp out vibrations in the system caused by extraneous motions of the instrument. It will be appreciated that in normal use the housing 130 is oriented with its base disposed in a vertical plane with the indicator 159 uppermost. Consequently, the Bourdon tube is disposed with its axis generally horizontal and at least one side of the Bourdon tube will bear against the post 176 to obtain this stability.

From the foregoing description it will be appreciated that unlike the instrument shown in FIGS. 3 and 4, the sensing assembly of this invention provides a direct readout from the Bourdon tube. That is, all intermediate linkages between the pointer of the indicator and the Bourdon tube itself have been eliminated. Consequently, some savings are realized in parts, and very appreciable labor savings are realized in the assembling of the device. Further, there is no inertia of the linkage system to be overcome before changes in pressure can be observed at the indicator. Rather, any change in pressure of the liquid in the system reflects directly in a twisting deflection of the Bourdon tube which directly carries the pointer 158.

From the foregoing description those skilled in the art will appreciate that the instrument of this invention satisfies the several objects set forth in the introduction. It will also be recognized that many modifications may be made of this invention without departing from its spirit. Therefore, it is not intended to limit the breadth of this invention to the embodiments illustrated and described.

What I claim is:

1. A direct measurement pressure gage comprising
    a frame having a coupler chamber at one end and a capillary tube extending through the frame from the chamber,
    a sensor assembly connected to the capillary tube, said sensor including a Bourdon Tube in the form of a helix with a plurality of turns and which displaces in response to changes in pressure,
    said coupler chamber being closed by a thin, flexible diaphragm
    liquid filling the chamber, capillary and Bourdon tubes,
    a filler insert in the Bourdon tube to reduce its liquid volume, the volume of liquid in the tubes and chamber being approximately in the order of .004 cubic inch,
    and a dial indicator including a pointer connected to the Bourdon tube.

2. A direct measurement pressure gage as defined in claim 1 further characterized by
    a sleeve rotatable on the frame adjacent the chamber,
    and a threaded section provided in the sleeve to enable the gage to be secured into a threaded hole without rotating the frame.

3. A direct measurement pressure gage as defined in claim 1 further characterized by
    said frame having a flexible section.

4. A direct measurement pressure gage as defined in claim 1 further characterized by
    said pointer being connected directly to the end of the tube for indicating tube deflection.

5. A direct measurement pressure gage as defined in claim 1 further characterized by
    a post disposed within the helix and frictionally engaging the turns for stabilizing the Bourdon tube.

6. A direct measurement pressure gage as defined in claim 4 further characterized by
    said Bourdon tube being flattened in the portion that forms the turns and having portions of circular cross section extending tangentially from each end.

7. A direct measurement pressure gage as defined in claim 6 further characterized by
    one circular section of the tube being coupled to the end of the capillary tube and the other circular section being coupled to the pointer.